UNITED STATES PATENT OFFICE.

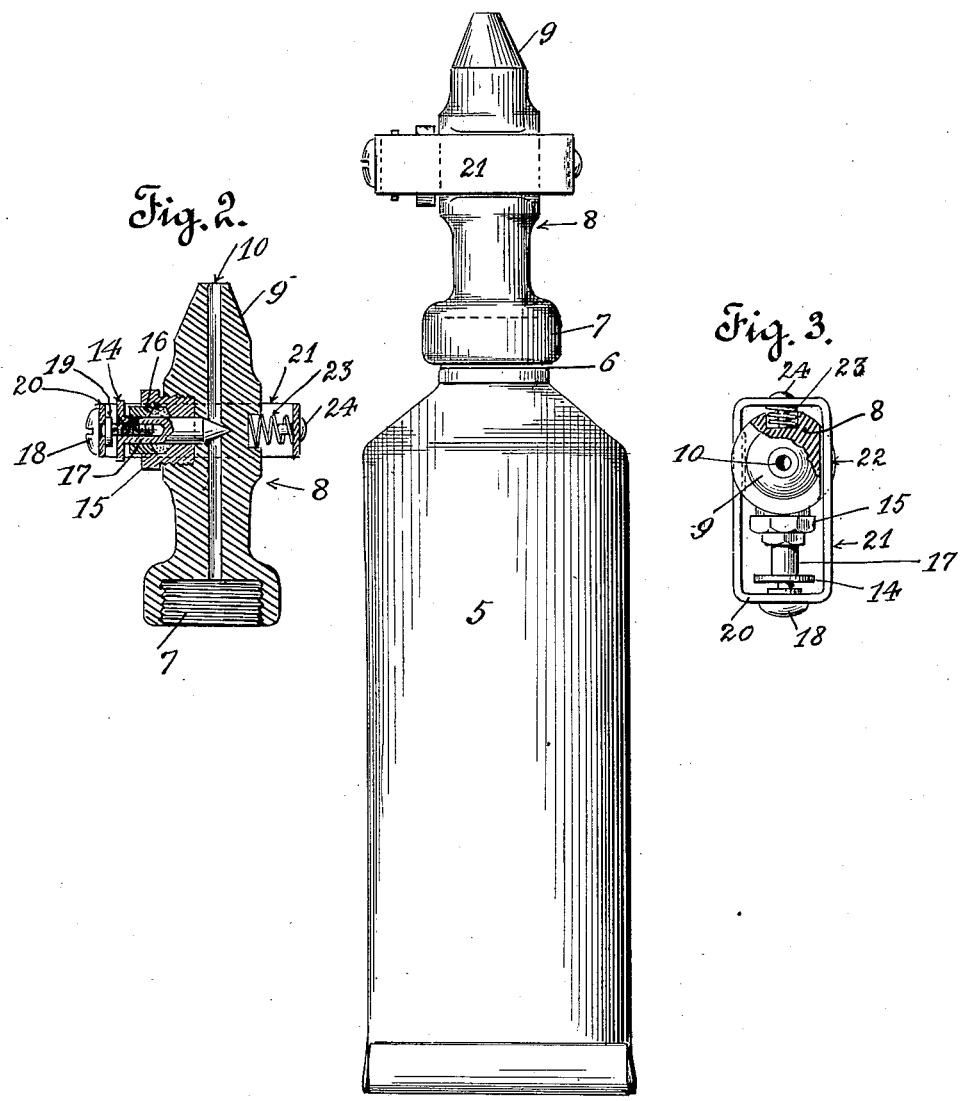

SAMUEL T. LUCE, OF SOUTH PASADENA, CALIFORNIA.

VALVE-CLOSURE.

1,095,647.  Specification of Letters Patent.  Patented May 5, 1914.

Application filed August 18, 1913. Serial No. 785,195.

*To all whom it may concern:*

Be it known that I, SAMUEL T. LUCE, a citizen of the United States, residing at South Pasadena, in the county of Los Angeles, State of California, have invented new and useful Improvements in Valve-Closures, of which the following is a specification.

This invention relates to automatic valves, and the principal object is to provide an automatically operated closure for a liquid dispenser.

It is also an object to provide a valve closure for a liquid dispensing apparatus provided with means to adjust the pressure exerted at the valve seat.

It is a further object to provide a reciprocating valve of the type mentioned, with means to form a tight joint surrounding the valve stem thereof.

In the drawings accompanying this specification and forming therewith the application for Letters Patent: Figure 1 is a view of a collapsible tube showing the invention applied thereto, the valve being in side elevation. Fig. 2 is a central longitudinal section thereof, a portion of the valve being shown in elevation. Fig. 3 is an end view of the valve, a portion of the casing being shown in section to clearly show the guide slots in the side thereof, together with the recess for the reception of the spring and the stop pin.

More specifically in the drawings, 5 designates a collapsible tube or other suitable container adapted to contain the type of remedial agent or antiseptic solution which this invention is particularly adaptable to act as a closure for, the valve itself being shown as attached to the container at its screw threaded orifice 6 by means of the threaded flanged extension 7 of the valve casing 8. This valve casing consists mainly of a cylindrical body having the flange previously mentioned and a nozzle end 9, a bore 10 being carried centrally therethrough within which, intermediate of its ends, is formed a seat for the reciprocating valve 11. This valve seat and the valve are preferably conical in form, the conical seat being extended on either side of the bore 10 so that a perfectly tight closure is formed at all times, the valve stem being extended outwardly from its valve seat engaging cone, preferably cylindrical in form and provided with a flange 14 at its outer end. A plug 15 forms a portion of the seat within which the cylindrical portion of the stem slides and this plug is threaded into a recess concentric with the bore adapted to receive the stem in the casing and is itself recessed to contain the valve packing 16. This packing is preferably held within the recess by means of the cap 17 threaded into the plug 15.

The valve stem itself is provided with a concentric bore from within outward which is threaded and adapted to receive the inner threaded portion of the screw 18 which is provided with a nut 19 which holds it securely in engagement with the cross portion 20 of the looped frame or yoke 21 which is adapted to embrace the large portion of the valve body adjacent the valve stem, the sides of the body being grooved, as shown at 22, to accommodate the parallel sides of the rectangular strap forming the yoke 21. The opposite side of the body to that receiving the plug 16 is provided with a recess which is of sufficient depth to receive the coiled spring 23 when the latter is compressed, this spring being coiled around a stop pin 24 which takes up against the bottom of the recess adapted to receive the spring and limits the movement of the valve outward, this movement being sufficient to completely unseat the valve and open the bore 10.

The operation of the device will be readily understood from the above description, it being possible to regulate the tension of the spring 23 or pressure exerted upon the valve to force the same to the seat by adjusting the screw 18 in relation to the stem, and when it is desired to operate the device the tube is grasped by the fingers of the hand and the thumb pressed upon the knob of the stop pin 24 which will open the valve and allow the escape of liquid from the tube.

What I claim is:

1. A valve closure, comprising a body member having a longitudinally disposed bore therethrough and a conical valve seat intersecting said bore, a reciprocating valve stem transversely mounted on said body member, said valve stem having a conical end and normally engaging said seat, packing means for said reciprocating valve stem, a manually operated valve stem actuating yoke reciprocatingly mounted on said body member and engaging said valve, resilient means interposed between the body member and said yoke to normally maintain said valve in a seated condition, and means to increase or decrease the tension of the resilient means, whereby the pressure of the valve stem on its seat may be regulated.

2. A valve closure, comprising an elongated body having a bore therethrough and a conical valve seat formed transversely of said bore, said body having a plurality of grooves oppositely disposed thereon and being in parallel relation to the axis of said valve seat, a valve stem having a point adapted to fit said seat, a packing gland surrounding said valve stem, a yoke embracing said body and adapted to slide in said grooves, adjustable connections between said yoke and said valve stem, resilient means interposed between the oppositely disposed portion of said yoke and said body, and a stop pin embraced by said spring and adapted to form a stop for said yoke when the resilient means is compressed.

In witness that I claim the foregoing I have hereunto subscribed my name this 8th day of August, 1913.

SAMUEL T. LUCE.

Witnesses:
MERLE HAMMOND,
MARIE BATTEY.

Copies of this patent may be obtained for five cents each, by addressing the "Commissioner of Patents, Washington, D. C."